June 7, 1927.
G. BARSKY
1,631,573
REFRIGERANT
Filed March 5, 1926
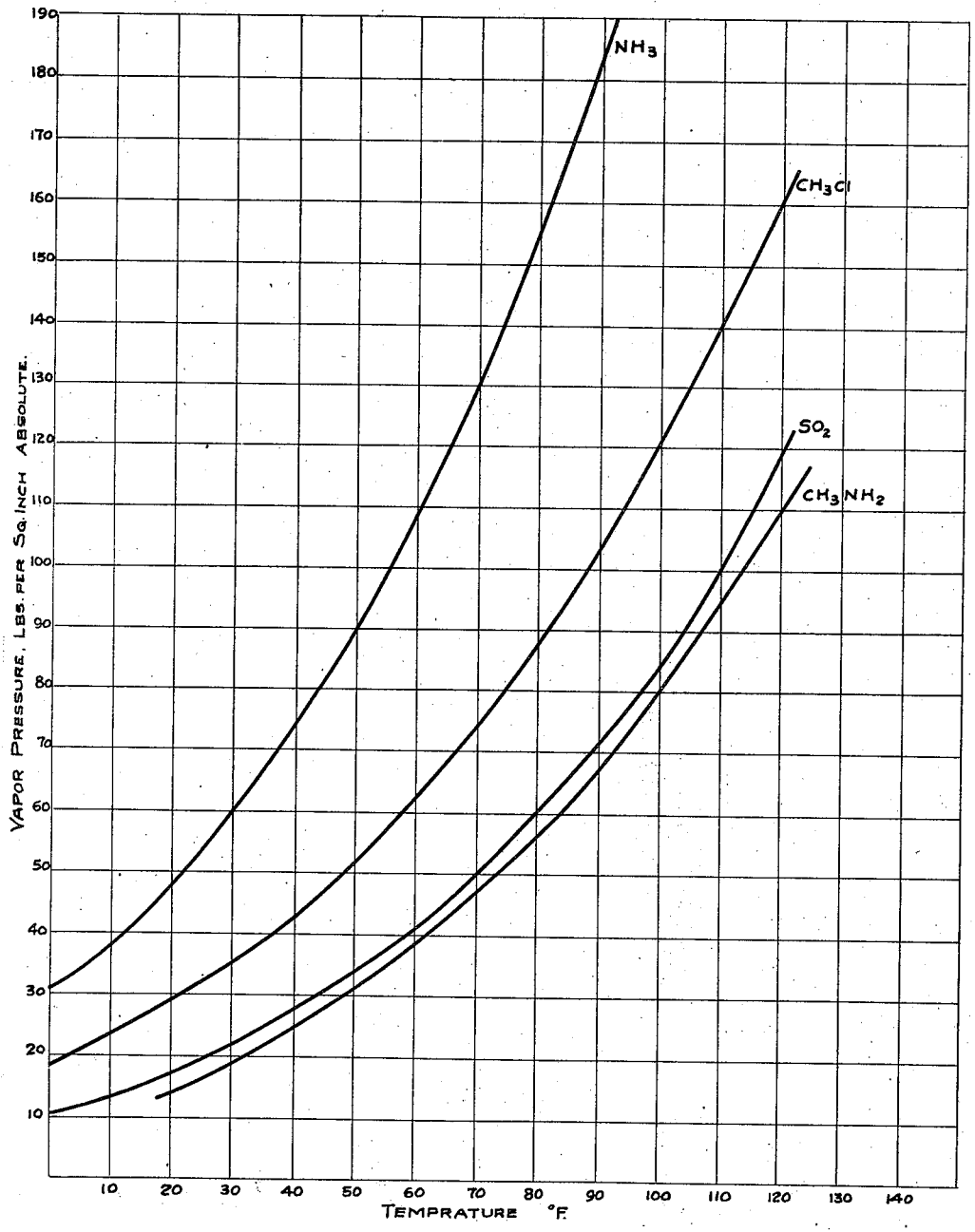
George Barsky, INVENTOR.
BY /S.C. Bierman
ATTORNEY.

Patented June 7, 1927.

1,631,573

UNITED STATES PATENT OFFICE.

GEORGE BARSKY, OF NEW YORK, N. Y., ASSIGNOR TO AMERICAN CYANAMID COMPANY, OF NEW YORK, N. Y., A CORPORATION OF MAINE.

REFRIGERANT.

Application filed March 5, 1926. Serial No. 92,429.

This invention relates to refrigeration, more particularly to a novel refrigerant for use in refrigeration systems in place of refrigerants previously utilized.

The two types of refrigerating systems in common usage are the absorption system and the compression system. The former makes use of the solubility of the refrigerant in a liquid, usually ammonia in water, the refrigerant being driven off by heat, liquefied, and then expanded to a gas to obtain the refrigerating effect, after which the gas is absorbed and the cycle repeated. In the latter system the liquid refrigerant is allowed to expand into a gas to give refrigeration and the gas is subjected to compression and cooling, liquefying the same, thus completing the cycle. In both of the systems use is made of the latent heat of vaporization of the refrigerant and other important characteristics are the freezing point, temperature and pressure of gasification and liquefaction, and the like.

Among the refrigerants previously in use are anhydrous ammonia, carbon dioxide, sulphur dioxide and methyl chloride. Of these ammonia is by far the best and is most extensively used. It has a very high latent heat of vaporization and is but slightly corrosive but it suffers from the disadvantage of requiring a high pressure for the liquefaction thereof. Compressors for this work are obtainable for large sizes and so ammonia is practically the only refrigerant used in large installations. But for small units, as in household refrigerator systems, it is extremely difficult to design compressors of small capacity which will run for long periods of time with no attention so that ammonia for this large and rapidly growing field has been replaced by the less efficient refrigerants such as sulphur dioxide and methyl chloride, which have a very low latent heat but require only a moderate pressure for liquefaction.

My invention is intended to obviate the disadvantages inherent in refrigerants previously used and to provide a refrigerant which shall have a high latent heat of vaporization and a low pressure for liquefaction.

The first requirement of a refrigerating fluid is that it shall not pass through the critical state when subjected to the cycles of operation in the machine. A consideration of prime importance is the pressure necessary to cause evaporation at low temperature. If the pressure of the saturated vapor is too low, large pipes and large compressors are required to handle the volume of vapor necessary. On the other hand, the condensing pressure is an important factor. If this is too high at the temperatures available for condensation, heavy and expensive piping and compressors are required. A very important property of the refrigerant is its latent heat, which, if too small, requires the circulation of large quantities of fluid to produce a given amount of refrigeration. Other factors to be considered are the cost of the fluid and its corrosive action on the metal parts of the machine. The freezing point of the liquid must be such that there is no danger of solidification taking place in the coils.

I have conducted a series of experiments as the result of which I have concluded that methylamine is an ideal refrigerant, either in the pure state in anhydrous condition or in admixture with other substances. For example I may take mono-methylamine sulphate, place it in a reaction vessel and treat with caustic soda solution liberating pure mono-methylamine which is passed through a dephlegmating tower, through solid caustic soda and then through a quick-lime tower to remove water from the gas, which is compressed, cooled and condensed in a suitable receiver. The anhydrous liquid mono-methylamine thus produced has been found to be ideal for household refrigeration systems. It has a very favorable latent heat of vaporization as shown by the following table:

|  | Latent heat (B. t. u. per lb.). | Freezing point (degrees Fahr.). |
|---|---|---|
| Ammonia | 533 at 32° F | −107 |
| Mono-methylamine | 358 at 32° F | <−110 |
| Methyl chloride | 174 at 32° F | −134 |
| Sulphur dioxide | 163 at 32° F | −105 |
| Carbon dioxide | 103 at 32° F | −71 |

It will be noted that the latent heat of vaporization of mono-methylamine approaches that of ammonia and is at least twice that of the best refrigerant used in household systems. The freezing point is so low that there is no danger of freezing in the system, being lower than that of ammonia.

The vapor pressure of mono-methylamine compares favorably with other refrigerants as will be seen in the accompanying drawing, the single figure of which is a series of curves showing the vapor pressures of the common refrigerants at different temperatures.

The curve for carbon dioxide is not shown as the vapor pressure thereof is too great to be plotted on the chart with the scale used. Mono-methylamine is far superior to ammonia and is somewhat better than methyl chloride and sulphur dioxide in that the pressure required for liquefaction is low, and at any given temperature it condenses at the lowest pressure of any of the substances commonly used. Its vapor pressure at the low temperature is not too low for economy in size of compressors.

The corrosive action of mono-methylamine is no greater than that of ammonia and iron can be used safely in the system. The use of mono-methylamine results in a decreased cost of the machine, primarily because of the high latent heat and the low pressure of liquefaction. The critical state of mono-methylamine is so far from the conditions met with in refrigeration practice that no difficulties can possibly arise from this source.

Although I have described my invention setting forth the use of pure mono-methylamine, my invention is not limited thereto. I have successfully blended the same with anhydrous ammonia and have succeeded in raising the latent heat of the mixture without materially increasing the pressure of liquefaction. The two substances do not show any tendency to separate or stratify in passing through the refrigerating cycle. For example, I have found a mixture of about 90% mono-methylamine and about 10% ammonia to be very satisfactory. I may also add other methylamines, such as the di- and tri-methylamine, usually in small amounts, either to mono-methylamine or mixtures thereof with ammonia. These substances tend to lower the pressure of liquefaction of the mono-methylamine and the effect thereof, if it should become objectionable, may be neutralized by the addition of ammonia which tends to raise the said pressure. These and other changes and variations may be made in my invention, the scope of which is defined in the claims appended hereto.

What I claim is:

1. A refrigerating composition comprising mono-methylamine and ammonia.

2. A refrigerating composition comprising mono-methylamine and ammonia, the mono-methylamine being the major constituent.

3. A refrigerating composition comprising mono-methylamine and ammonia in the proportions of about 90 parts mono-methylamine and about 10 parts of ammonia.

4. A refrigerating composition comprising mono-methylamine and ammonia in the proportions of about 90 parts of mono-methylamine and about 10 parts of ammonia with a smaller amount of di- and tri-methylamine.

5. A refrigerating composition comprising mono-, di- and tri-methylamine and ammonia.

In testimony whereof, I have hereunto subscribed my name this 27th day of Feb. 1926.

GEORGE BARSKY.